United States Patent [19]

Thorpe

[11] Patent Number: 4,797,429
[45] Date of Patent: Jan. 10, 1989

[54] BROMINE-CONTAINING POLYOLS
[75] Inventor: David Thorpe, Everberg, Belgium
[73] Assignee: Imperial Chemical Industries PLC, London, England
[21] Appl. No.: 24,569
[22] Filed: Mar. 11, 1987
[30] Foreign Application Priority Data
Mar. 12, 1986 [GB] United Kingdom ............... 8606066
[51] Int. Cl.[4] ............................................. C08G 59/00
[52] U.S. Cl. .................... 521/163; 521/167; 521/170; 521/171; 521/173
[58] Field of Search ............... 521/163, 167, 170, 171, 521/173

[56] References Cited

U.S. PATENT DOCUMENTS

3,297,597  1/1967  Edwards et al. ................. 521/159
4,487,852 12/1984  Brennan et al. ................. 521/167
4,621,104 11/1986  Dietrich et al. ................. 521/171

FOREIGN PATENT DOCUMENTS

1450702  9/1976  United Kingdom .

OTHER PUBLICATIONS

Sucharda-Sobczyk et al, *Polish Journal of Chemistry*, vol. 52, 1555-59, 1978.

Primary Examiner—Morton Foelak
Assistant Examiner—S. A. Acquah
Attorney, Agent, or Firm—Cushman, Darby & Cushman

[57] ABSTRACT

New Mannich bases of the formula

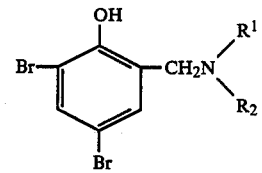

wherein each of $R^1$ and $R^2$, independently, represents a hydroxyalkyl radical, and to oxyalkylation derivatives of the formula

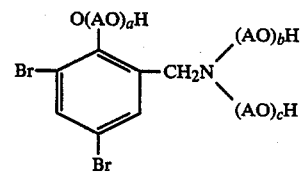

wherein each of a, b and c represents zero or a positive integer, their sum being in the range from 3 to 8, and wherein each A radical represents independently a propylene or ethylene radical. The compounds according to the invention are useful for the manufacture of rigid polyurethane foams.

10 Claims, No Drawings

BROMINE-CONTAINING POLYOLS

FIELD OF THE INVENTION

This invention relates to bromine-containing polyols, to methods for their manufacture and to their use in the manufacture of foamed polymers.

BACKGROUND OF THE INVENTION

The production of rigid polyurethane foams from organic polyisocyanates and polyols having on average three or more hydroxyl groups per molecule, has been well established for over thirty years. During this time, the foams have become increasingly important as insulating materials and structural components in the construction, transport and other industries because of their ease of manufacture and outstanding thermal insulation properties.

However, polyurethane foams, like most other organic materials, are readily combustible and, in order to comply with increasingly stringent regulations and codes of practice, flame-retardants are often included in the foam-forming reaction mixture. The flame retardants used are generally of two types, those that are merely physically incorporated into the foam structure and those that become chemically incorporated by taking part in polyurethane formation. The first type of flame retardant includes materials such as tris(2-chloroethyl) phosphate, tris(2,3-dibromopropyl) phosphate and antimony oxides.

When used in an amount to provide a high degree of flame resistance, this type of agent often has an adverse effect on the foam's mechanical properties. The second type of flame-retardant is represented by various phosphorus-containing polyols and chlorendic acid derivatives. These agents can be expensive and often have high viscosities. U.S. Pat. No. 3,297,597 describes certain nitrogen-containing polyols which are said to provide rigid polyurethane foam characterised by greater ease of fire retardancy and good dimensional strength when extraneous fire retardants are employed. The nitrogen-containing polyols are oxyalkylated Mannich condensation products of a phenolic compound with formaldehyde and an alkanolamine. A preferred phenolic compound seems to be phenol itself which has three active positions on the aromatic ring at which reaction can occur.

It has now been found that certain Mannich bases derived from 2,4-dibromophenol are useful materials from which rigid foam polyols may be prepared.

SUMMARY OF THE INVENTION

Accordingly, the invention provides Mannich bases of the formula:

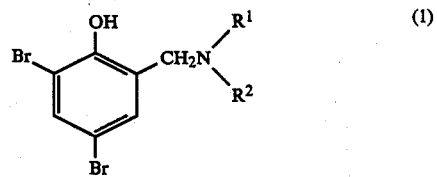

wherein each of $R^1$ and $R^2$, independently, represents a hydroxyalkyl radical having 1 to 6 carbon atoms.

Preferably the hydroxyalkyl radicals which may b represented by $R^1$ and $R^2$ include the 2-hydroxypropyl radical and especially the 2-hydroxyethyl radical. Thus, a particularly useful material is the product of the formula:

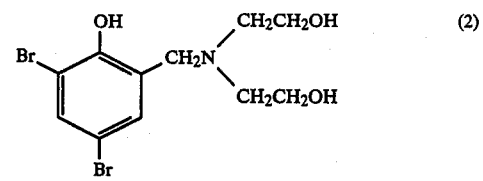

It is observed that GB No. 1450702 discloses monoalkanol Mannich base derivatives of 2,4-dibromophenol, which compounds are reported to possess antitussive and expectorant properties.

DETAILED DISCUSSION

The compounds of formula 1 may be prepared under standard Mannich reaction conditions. Thus, 2,4-dibromophenol, formaldehyde and a compound of the formula

wherein $R^1$ and $R^2$ have the same meanings as in formula 1, may be reacted together in the approximate molar ratio 1:1:1. Formaldehyde may be used in any of its usual forms, for example an aqueous or methanolic solution, paraformaldehyde or trioxane. Compounds of formula 3 which may be used include di-isopropanolamine, ethanol-isopropanolamine and especially diethanolamine.

The reaction may be performed at ambient or elevated temperatures, the formaldehyde suitably being slowly added to a mixture of the dibromophenol and the compound of formula 3. At the end of the formaldehyde addirion, the temperature is raised to at least about 50 Deg. C. and maintained for a sufficient time to reduce the formaldehyde content to an acceptable level, for example below 1% on a weight basis. Water may then be stripped from the reaction mixture by, for example, heating under reduced pressure.

Whilst the Mannich bases of formula 1 may themselves be employed in polyurethane formulations as fire retardants, their high viscosities can cause mixing difficulties and accordingly it is preferred to use the compounds of formula 1 in the form of their oxyalkylation products. Accordingly the invention also relates to the oxyalkylation products of compounds of formula 1.

It has furthermore been found that the oxyalkylation products of compounds of the formula

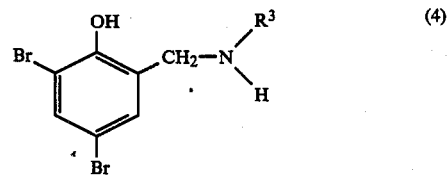

wherein $R^3$ represents hydrogen or a hydroxyalkyl radical having 1 to 6, preferably 1-3, carbon atoms, are also useful polyol materials for the manufacture of rigid foams.

Accordingly the invention also relates to the oxyalkylation products of compounds of formula 4.

Such products may be obtained by reacting a compound of formula 1 or a compound of formula 4 with one or more alkylene oxides under standard oxyalkylation conditions although a basic catalyst is sometimes not required because of the basicity of the compounds of formula 1 and formula 4.

Suitable alkylene oxides for use in the oxyalkylation include ethylene oxide, propylene oxide, butylene oxide, styrene oxide and glycidol. When two or more alkylene oxides are used, they may be reacted either simultaneously or sequentially with the compound of formula 1 or 4. The preferred alkylene oxides are propylene oxide, ethylene oxide and combinations of the two.

Suitable oxyalkylation products for use as fire retardant rigid foams polyols in polyurethane formulations include those reaction products of compounds of formula 1 and 4, and especially the compound of formula 2, with propylene oxide and/or ethylene oxide, having hydroxyl numbers in the range 230 to 410 and especially 300 to 350. Such oxyalkylation products particularly include the reaction products of the compound of formula 2 with from 1 to 6 and especially from 2 to 3 moles of propylene oxide.

Structurally, the preferred oxyalkylation products may be represented by the general formula:

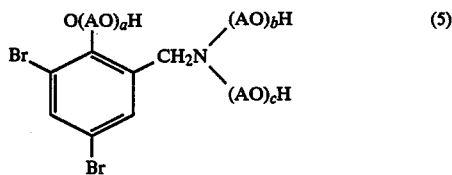

(5)

wherein each of a, b and c represents zero or a positive integer, their sum being in the range from 3 to 8, preferably from 4 to 5, and wherein each A radical represents independently a propylene or ethylene radical. Oxypropylene and oxyethylene units may thus be present together in the same molecule.

The oxyalkylated Mannich bases of the invention may be used in polyurethane rigid foam formulations as the sole polyol or in admixture with other rigid foam polyols, for example polyols containing from 2 to 8 hydroxyl groups per molecule and having hydroxyl numbers in the range 200 to 800.

Other rigid foam polyols which may be used in conjunction with the oxyalkylated Mannich bases, include polyether and polyester polyols such as have already been described or used in the polyurethane art. Suitable polyether polyols include the reaction products of propylene oxide and/or ethylene oxide, and optionally other alkylene oxides, with compounds having from 2 to 8 active hydrogen atoms, for example water, polyhydric alcohols such as ethylene glycol, diethylene glycol, glycerol, trimethylolpropane, mono-, di- or triethanolamine, pentaerythritol, sorbitol, methyl glucoside and sucrose and polyamines, for example ethylene diamine, tolylene diamine, diaminodiphenylmethane and other aniline/formaldehyde reaction products. Mixtures of the oxyalkylated Mannich bases and other oxyalkylation products may be prepared by physically mixing the two or more separate materials or by oxyalkylating a mixture or a Mannich base of formula 1 and a polyhydric initiator of the types mentioned above.

Polyester polyols which may be used in conjunction with the oxyalkylated Mannich bases include the reaction products of dibasic acids, for example succinic, glutaric, adipic, phthalic, isophthalic and terephthalic acids with glycols, for example ethylene glycol, propylene glycol, diethylene glycol and 1,4-butanediol and higher functionality polyols, for example glycerol, trimethylolpropane and pentaeythritol. thritol.

The oxyalkylated Mannich bases of the invention may be used in admixture with other rigid foam polyols in any proportions but it is preferred that the oxyalkylated Mannich base is present in sufficient amount to provide a significant improvement in the fire retardancy of the resulting foam. Particularly useful foam formulations contain a polyol component containing from 10 to 100% by weight of an oxyalkylated Mannich base of the invention, for example a product of formula 4, and from 90 to 0% by weight of a second polyol, especially a rigid foam polyol as described above. Preferred polyol components contain from 30 to 100% by weight of the oxyalkylated Mannich base and from 70 to 0% by weight of the second rigid foam polyol.

Rigid foams may be prepared from the oxyalkylated Mannich bases using any of the techniques used or known in the polyurethane art. In general, foam preparation involves reacting the oxyalkylation product, and optionally one or more other polyols as described above, with an organic polyisocyanate in conjunction with a foaming agent and optionally catalysts, surfactants and other conventional adjuvants.

Suitable polyisocyanates include tolylene diisocyanate and especially diphenylmethane diisocyanate which is preferably used in admixture with related polymethylene polyphenyl isocyanates in the form commonly known as crude MDI. The isocyanate index (NCO/OH) ratio may be conventional for rigid polyurethane foam formulations, for example about 110, or it may be much higher, for example up to 500, with the inclusion of a trimerisation catalyst, for example potassium acetate, to bring about polyisocyanurate formation.

Foaming agents which may be used include water and inert volatile liquids such a trichlorofluoromethane, dichlorodifluoromethane or methylene chloride. Catalysts include the usual tertiary amines and tin compounds whilst useful surfactants include siloxane-oxyalkylene copolymers and conventional non-ionic types. Whilst a high level of fire retardancy is imparted to the foams by the oxyalkylated Mannich bases of the invention, the addition of a further fire retardant, especially a phosphorus or antimony compound, can often be advantageous. Suitable additives include dimethyl methylphosphonate and antimony oxides whilst other established additives such as tris-2-(chloroethyl) phosphate may also be useful in lowering the viscosity of the reaction mixture.

The rigid foams may be prepared using any of the conventional mixing methods and are characterised by excellent physical properties and high levels of fire retardancy. Those oxyalkylated Mannich bases described herein which have high proportions of primary hydroxyl groups are especially useful in the production of foams by spraying techniques. The primary hydroxyls may be formed by using ethylene oxide in the oxyalkylation process, or, alternatively, a Mannich base already containing primary hydroxyls, for example the compound of formula 2, may be reacted with only 1-2 moles of propylene oxide. Those polyols of the invention having lower proportions of primary hydroxyls are useful in other foaming methods, for example lamination processes.

The invention is illustrated but not limited by the following example.

EXAMPLE 1

Preparation of 2,4-dibromo-6-[N,N-di(2-hydroxyethyl) aminomethyl] phenol.

252 g of 2,4-dibromophenol and 105 g of diethanolamine were charged to a 1 liter round-bottomed flask fitted with an agitator. The temperature of the clear viscous liquid was adjusted to 40 Deg. C. and 100 g of formalin (30% formaldehyde in water stabilised with methanol) was added dropwise over 1 hour while maintaining the temperature at 40–45 Deg C. The temperature was then raised to 100–110 Deg. C. and maintained at that temperature for 4 hours. Vacuum was then applied to distil off excess formaldehyde, methanol and water.

When no more water could be distilled from the product, the vacuum was released. A sample of the reaction mixture was then analysed by $C^{13}$-NMR-spectroscopy. Identification of the peaks within the ppm ranges (DMSO) 154.6–154.2, 132.8–132.4, 130.5–130.1, 126.4–126.0, 110.2–109.8, 109.2–108.8 and 56.4–56.8, demonstrated the presence of a predominant amount of the title product.

EXAMPLE 2

Preparation of an oxypropylation derivative.

To the reaction mixture as obtained according to example 1, there was added 116 g of propylene oxide by dropwise addition over a period of 2 hours, while maintaining the temperature at 80–96 Deg. C. with agitation. At this stage, the flask was fitted with a reflux condenser protected by a cold finger (dry ice/acetone) to ensure refluxing of propylene oxide. When all the propylene oxide had been added, the contents of the flask were stirred at 90–100 Deg. C. for a further 1 hour. The product was a viscous, dark red-brown oil with an OH value of 380 mgKOH/g.

EXAMPLE 3

Preparation of a polyurethane foam.

23 g of the oxypropylated product obtained in accordance with example 2, was mixed with 66.6 g of a second glycol, 10 g of dimethyl methyl phosphonate, 2 g of Goldschmidt Silicone B8406, 27.5 g of trichlorofluoromethane, 1.6 g of N,N-dimethyl cyclohexylamethane and 0.8 g of water. This single phase, low-viscosity mixture was mixed rapidly with 133.9 g of polyisocyanate and poured into a 15×15 cm², open-topped box of height 30 cm. After 5 minutes, a rigid polyurethane foam with uniform cell structure was removed from the mould.

The foam had a core density of 32 kg/m³. Subjected to the fire tests the foam had, according to ASTM D2863, an oxygen index of 25.5 and it achieved a class B2 according to DIN 4102.

The second polyol used in this example was obtained by oxypropylating a sucrose/triethanolamine mixture to a hydroxy value of 490 mgKOH/g.

The polyisocyanate was a high functionality polymethylene polyphenyl polyisocyanate.

EXAMPLE 4

Preparation of 2,4-dibromo-6-[N,N-di-(2-hydroxy isopropyl) aminomethyl] phenol.

Applying the same procedure as described in example 1, using diisopropanolamine instead of diethanolamine and maintaining the reaction mixture at 100–110 Deg. C. for six hours, the title product was obtained in a predominant amount, as evidenced by $C^{13}$-NMR-spectroscopy at the measurement conditions described in example 1.

EXAMPLE 5

Preparation of 2,4-dibromo-6-[N-(2-hydroxyethyl), N-(2-hydroxyisopropyl) aminomethyl] phenol.

Applying the same procedure as described in example 1, using monoethanol, monoisopropanolamine instead of diethanolamine and maintaining the reaction mixture at 100–110 Deg. C. for eight hours, the title product was obtained in a predominant amount, as evidenced by $C^{13}$-NMR-spectroscopy at the measurement conditions described in example 1.

When subjecting the compounds of examples 4 and 5 to oxypropylation, oxypropylated derivatives are obtained which can be used in polyurethane formulation.

Comparable results are obtained when subjecting the products of examples 1, 4 and 5 to oxyethylation, to sequential oxypropylation and oxyethylation, and to random oxyethylation/oxypropylation.

I claim:

1. A Mannich base of the formula:

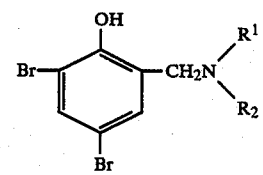

wherein each of $R^1$ and $R^2$, independently, represents a hydroxyalkyl radical.

2. A Mannich base according to claim 1 having the formula:

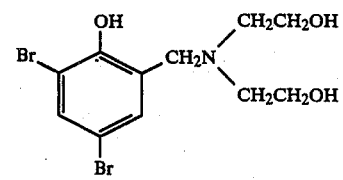

3. An oxyalkylation product of a Mannich base according to the formula:

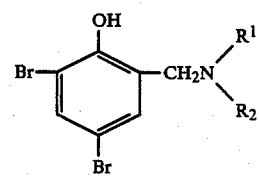

or the formula:

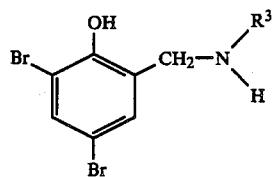

wherein each of $R^1$ and $R^2$, independently, represents a hydroxyalkyl radical, and wherein $R^3$ represents hydrogen or a hydroxyalkyl radical.

4. A 2,4-dibromo, 6-aminomethyl phenol derivative of the formula:

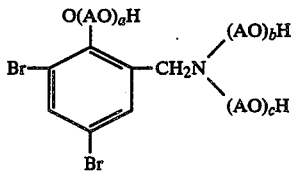

wherein each of a, b and c represents zero or a positive integer, their sum being in the range from 3 to 8, preferably from 4 to 5, and wherein each A radical represents independently a propylene or ethylene radical.

5. A reaction product of a Mannich base of formula:

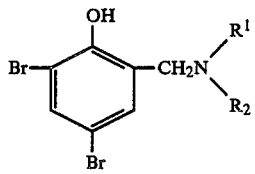

or of formula:

wherein each of $R^1$ and $R^2$, independently, represents a hydroxyalkyl radical, and wherein $R^3$ represents hydrogen or a hydroxyalkyl radical,
with propylene oxide and/or ethylene oxide, having a hydroxyl number from 230 to 410.

6. A reaction product according to claim 5 having a hydroxyl number in the range 300 to 350.

7. A reaction product of the Mannich base of claim 2 with from 1 to 6 moles of propylene oxide per mole.

8. A reaction product of the Mannich base of claim 2 with from 2 to 3 moles of propylene oxide per mole.

9. A method for the preparation of polyurethane foam which comprises reacting an organic polyisocyanate with a polyol component comprising from 10 to 100% by weight of an oxyalkylation product according to any one of claims 3 to 8 and from 90 to 0% of a second polyol.

10. Polyurethane foams prepared according to the method of claim 9.

* * * * *